United States Patent [19]

Thompson

[11] Patent Number: 5,592,992
[45] Date of Patent: Jan. 14, 1997

[54] LAWN EDGER BLADE ASSEMBLY

[76] Inventor: Timothy J. Thompson, 9921 Ridge Dr., Indianapolis, Ind. 46256

[21] Appl. No.: 482,863

[22] Filed: Jun. 7, 1995

[51] Int. Cl.⁶ ................................................ A01B 45/04
[52] U.S. Cl. ............................ 172/15; 172/17; 172/42; 172/123; 172/548; 172/766; 30/347; 30/DIG. 5
[58] Field of Search ................................ 172/15, 13, 17, 172/766, 772, 772.5, 42, 118, 119, 120, 122, 123, 121, 548; 37/364, 365, 352, 94; 56/256, 255, 295; 30/347, 500, DIG. 5, 508, 265

[56] References Cited

U.S. PATENT DOCUMENTS

| | | | |
|---|---|---|---|
| 2,515,732 | 7/1950 | Parry | 172/15 |
| 2,555,441 | 6/1951 | Hackney. | |
| 2,630,747 | 3/1953 | Mintz | 56/256 X |
| 2,634,667 | 4/1953 | Woolwine | 172/15 |
| 2,723,614 | 11/1955 | Engwall | 172/15 |
| 2,746,229 | 5/1956 | Orr | 56/256 |
| 2,826,889 | 3/1958 | Menge | 172/15 X |
| 2,882,977 | 4/1959 | Smith et al. | 172/15 |
| 2,913,058 | 11/1959 | Smith et al. | 172/15 |
| 3,102,376 | 9/1963 | Henderson | 172/15 |
| 3,141,507 | 7/1964 | Henry et al. | 172/15 |
| 3,690,384 | 9/1972 | Patterson | 172/15 X |
| 3,739,856 | 6/1973 | Ray | 56/256 X |
| 3,907,040 | 9/1975 | Trusty | 172/15 |
| 4,002,205 | 1/1977 | Falk | 172/15 |
| 4,072,195 | 2/1978 | Carlson | 172/15 |
| 4,653,590 | 3/1987 | Shank | 172/15 |
| 4,678,042 | 7/1987 | Barton et al. | 172/15 |
| 4,706,446 | 11/1987 | Doi et al. | 30/347 X |
| 4,979,573 | 12/1990 | Williamson | 172/15 |

FOREIGN PATENT DOCUMENTS

| | | | |
|---|---|---|---|
| 0109571 | 5/1984 | European Pat. Off. | 172/15 |
| 602692 | 3/1960 | Italy | 37/365 |

*Primary Examiner*—Terry Lee Melius
*Assistant Examiner*—Christopher J. Novosad
*Attorney, Agent, or Firm*—Woodard, Emhardt, Naughton, Moriarty & McNett

[57] ABSTRACT

A blade assembly for a lawn edging machine. The blade assembly includes a hub, at least two spaced-apart blade members having two or more blade arms extending radially therefrom, and a horizontal blade member connecting the two blade members at their radially extended arm ends.

10 Claims, 3 Drawing Sheets

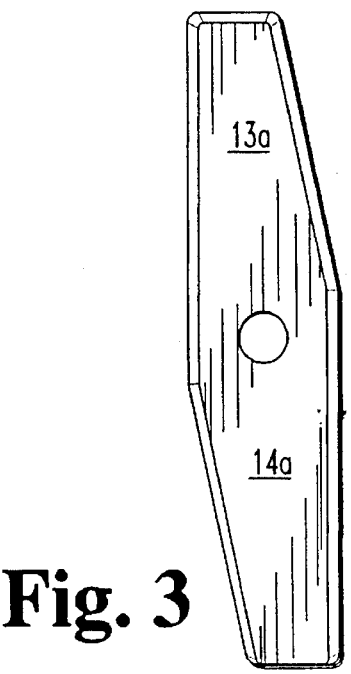
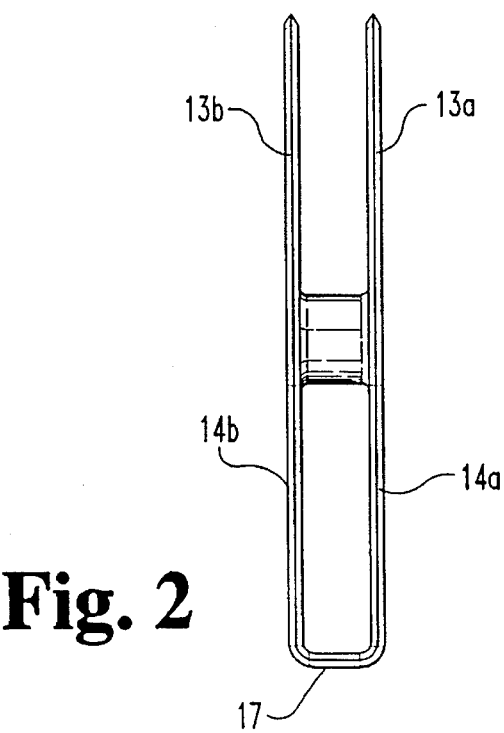
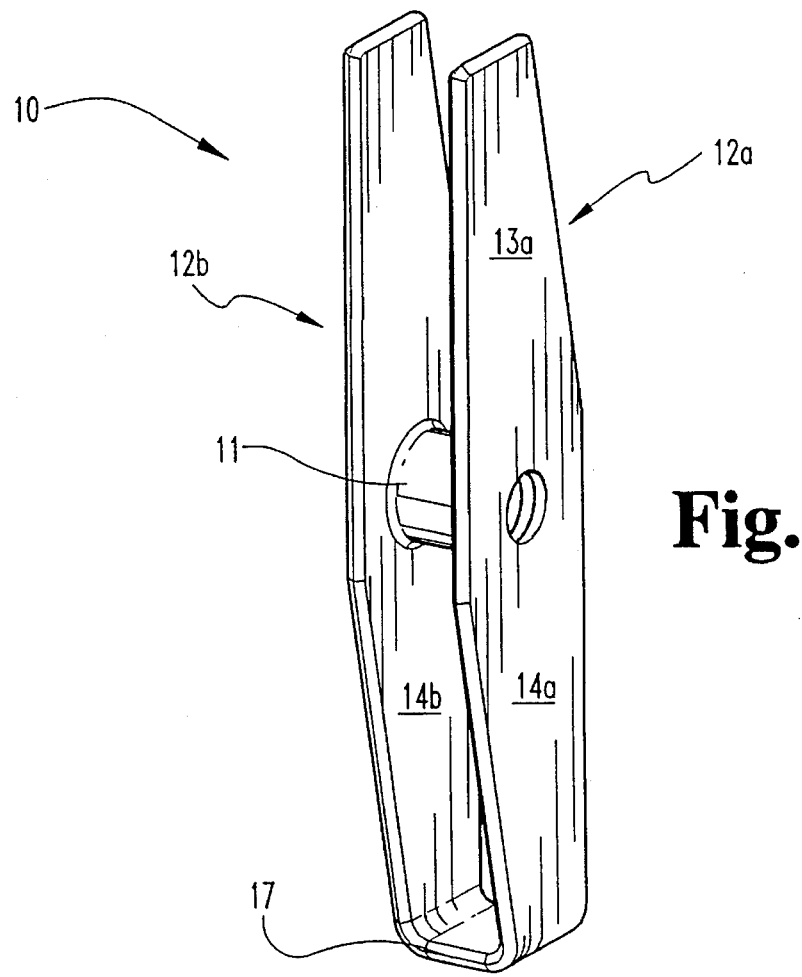

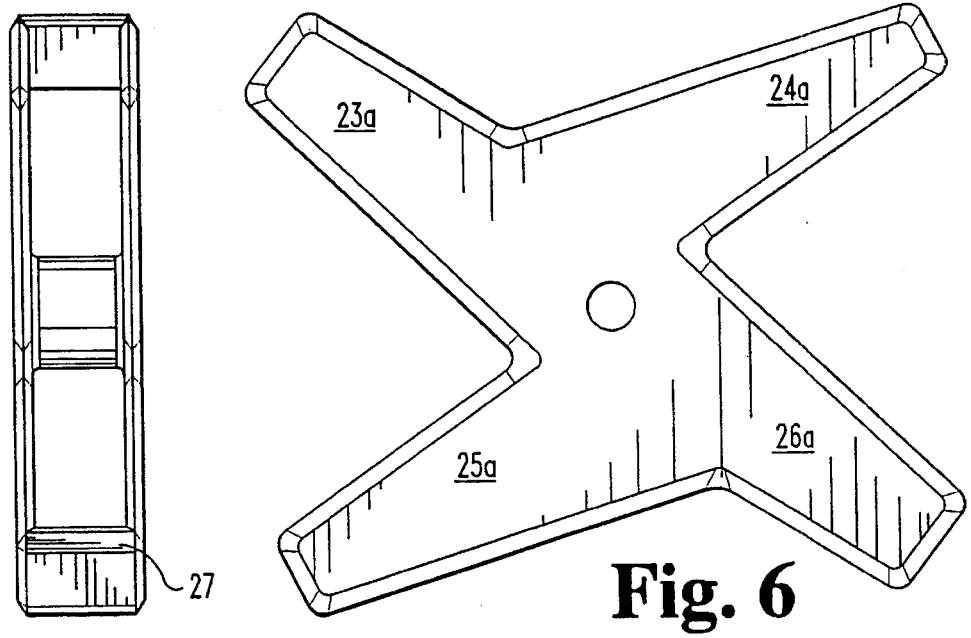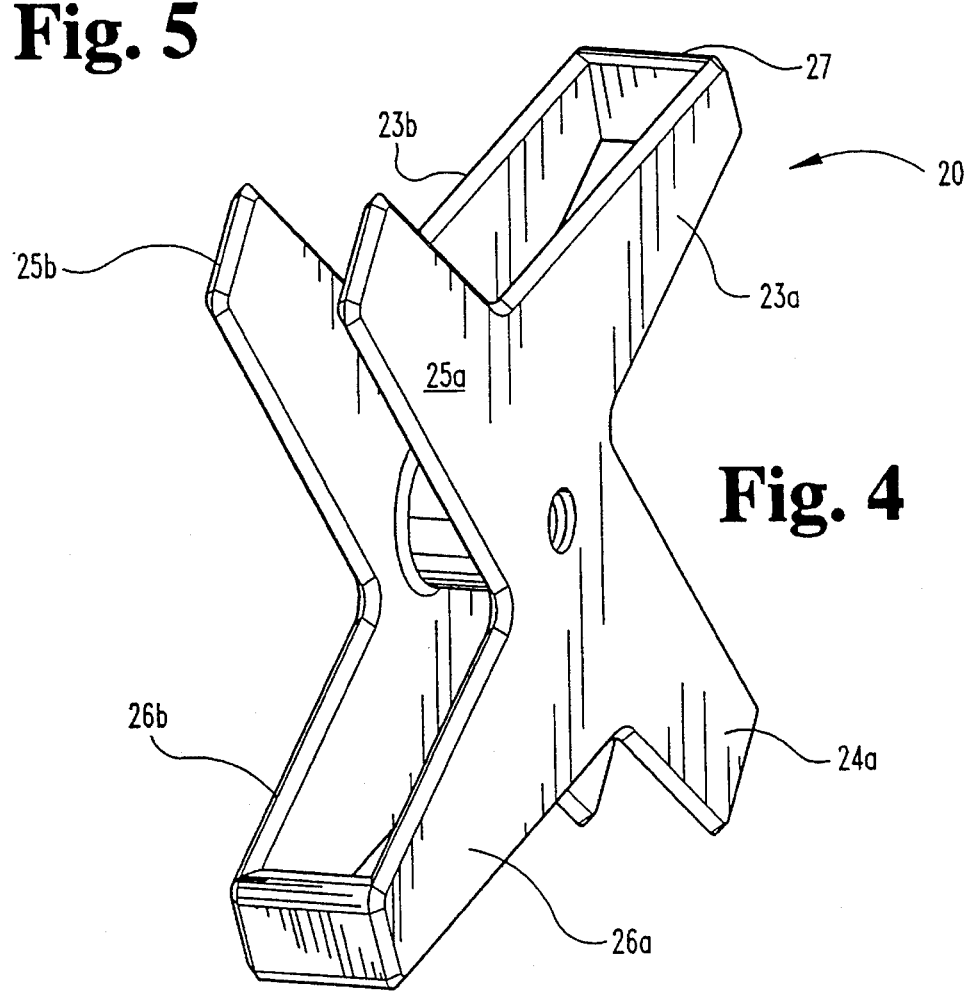

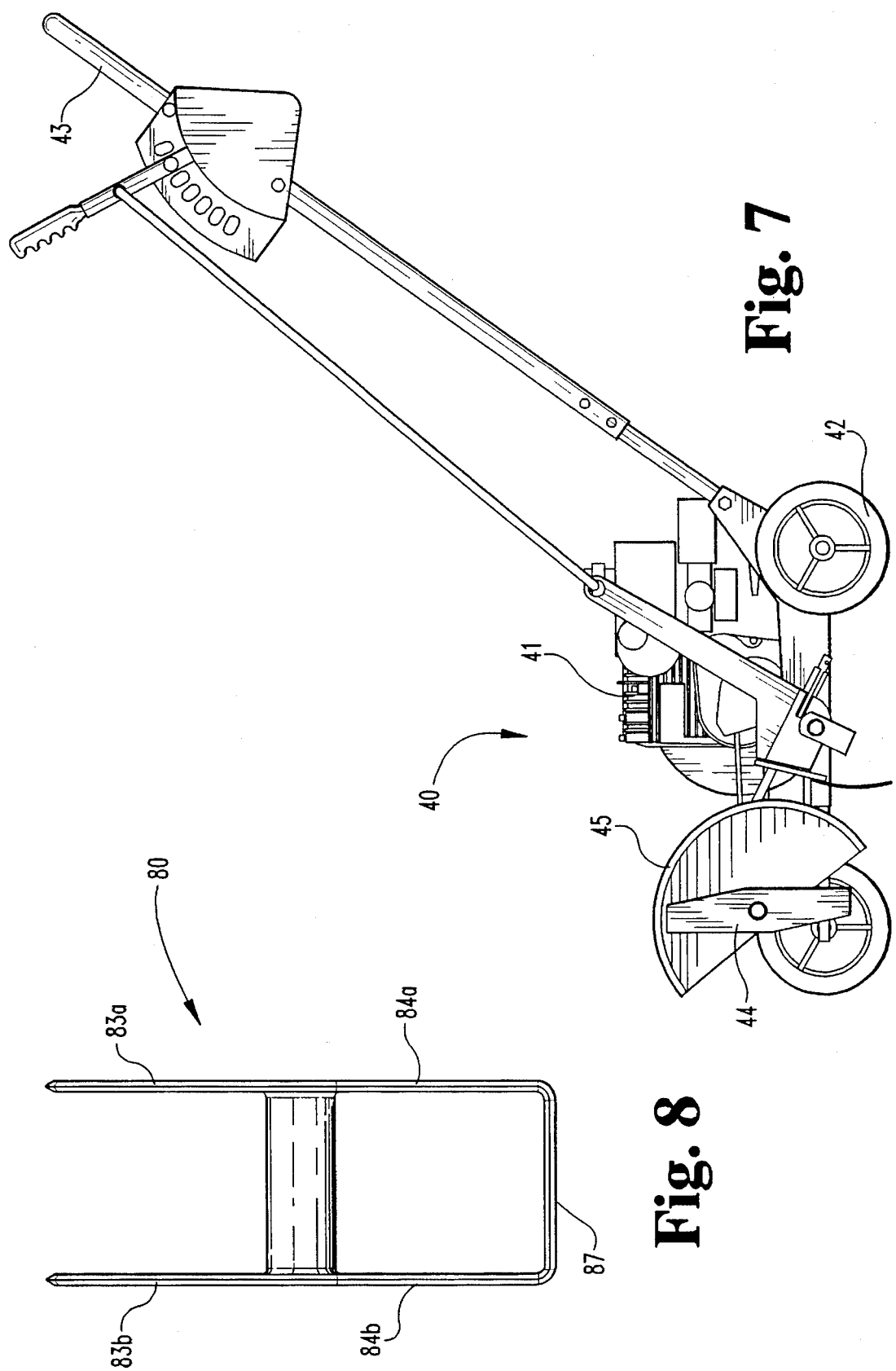

LAWN EDGER BLADE ASSEMBLY

FIELD OF THE INVENTION

The present invention relates generally to lawn edgers, and more particularly to quick-change lawn edger blades that cut a wide edging path.

BACKGROUND TO THE INVENTION

As is known to the art, lawn edgers are generally used to cut a narrow swath of grass from the area immediately adjacent to walkways, driveways, landscape features, buildings and the like. This edging gives the lawn a clean, well manicured look that is pleasing to the eye and easier to mow and maintain than unedged lawns.

A variety of lawn edgers are known to the art for use in residential and commercial settings. The vast majority of these machines use a single blade that rotates in a substantially vertical plane rather than in the horizontal plane normally used by standard lawn mowers. The blades are typically ⅛" to ¼" thick, and cut a swath of approximately equal thickness.

In certain situations it is desirable to have a somewhat wider cut than is available with standard lawn edgers. Thus, a variety of specialty blades have been developed with varying degrees of success. For example, U.S Pat. No. 2,913,058 to Smith et al. discloses a lawn edger which may include horizontal blades adapted to cut a somewhat wider path. Also, U.S. Pat. No. 3,141,507 to Henry et al. discloses a trimming machine with wide blades for trimming grass areas along curbing or the like. Similarly, U.S. Pat. No. 4,979,573 to Williamson discloses a lawn edger apparatus having a wide (up to ½") blade for providing a wider edge cut to lawn.

In other attempts to provide wide lawn edging cuts multiple blades have been used. For example, U.S. Pat. No. 4,678,042 to Barton et al. discloses an apparatus for cutting lines on athletic fields comprising a multiplicity of spaced-apart blades. Similarly, U.S. Pat. No. 4,653,590 to Shank uses multiple blades for cutting a furrow between a sidewalk edge and the adjacent soil.

None of the lawn edging machines of the prior art were particularly useful for the homeowner seeking a quick, easy and inexpensive method for providing wide edging cuts of a variety of widths. With prior art machines only one width of cut was generally available, the machines being particularly adapted for a single, unique purpose.

A need therefore continues to exist for a lawn edgers with blades that cut a wider path than is available from standard lawn edgers. A need also exists for a lawn edger with interchangeable blades so that a particular, desired cut width can be achieved. The present invention addresses both of these needs.

SUMMARY OF THE INVENTION

Briefly describing the present invention there is provided a blade assembly for a lawn edging machine. The blade assembly includes a hub, at least two spaced-apart blade members, each blade member having two or more blade arms extending radially therefrom, and a horizontal blade member connecting the two blade members at their radially extended arm ends.

One object of the present invention is to provide a lawn edger blade assembly for cutting a wide swath.

Another object of the present invention is to provide a lawn edger blade assembly that is replaceable so that a variety of cut widths may be selected and achieved.

Further objects and advantages of the present invention will be apparent from the following description.

BRIEF DESCRIPTION OF THE DRAWINGS

FIG. 1 is a perspective view of the lawn edger blade assembly of the present invention according to one preferred embodiment.

FIG. 2 is a front elevational view of the lawn edger blade assembly of FIG. 1.

FIG. 3 is a side elevational view of the lawn edger blade assembly of FIG. 1.

FIG. 4 is a perspective view of the lawn edger blade assembly of the present invention according to a second preferred embodiment.

FIG. 5 is a front elevational view of the lawn edger blade assembly of FIG. 4.

FIG. 6 is a side elevational view of the lawn edger blade assembly of FIG. 4.

FIG. 7 shows the lawn edger blade assembly attached to a lawn edger machine.

FIG. 8 is a front elevational view of the lawn edger blade assembly of the present invention according to one "extra-wide" cut path embodiment.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

The present invention relates generally to lawn edgers with a series of interchangeable blades to provide a variety of wide edging cuts. The blade assemblies of the present invention are an improved design which is inexpensive to manufacture yet which provides a superior cut when compared to the cuts available with conventional machines. As indicated, the lawn edger blade assemblies are also quickly replaceable so that any of a variety of cut widths can be selected and obtained.

Referring now to the drawings, FIGS. 1–3 shows the lawn edger blade assembly of the present invention according to its simplest embodiment. Blade assembly 10 includes a hub 11 and blade members 12a and 12b. Each blade member includes two or more blade arms (e.g., blade arms 13a and 14a, or blade arms 13b and 14b) extending radially from hub 11. A third blade member 17 connects at least two adjacent blade arms at their radially extended ends.

The blade arms are preferably arranged so that the blade arms of each blade member are coplanar. Thus, each blade member defines a plane which is spaced apart from the other blade member to provide a wide cut path. The third blade member further facilitates cutting the wide cut path, and is therefore preferably oriented horizontally with respect to the axis of blade rotation. Because the third blade member is positioned laterally to bridge the space between the two radially extending blade arms, the third blade arm may be referred to as the lateral blade arm.

The blade arms are preferably sharpened along their cutting edges to facilitate the edging process. At a minimum, third blade member 17 and the leading edges of blade arms 13a/13b and 14a/14b are sharpened as with conventional lawn mowing or edging blades.

In a more preferred embodiment (shown in FIGS. 4–6) each blade member 22a and 22b of blade assembly 20 includes four blade arms—23a/23b, 24a/24b, 25a/25b and 26a/26b. In this embodiment it is preferred that at least two adjacent pairs of blade arms be connected at their radially extended ends by a third blade member 27. Most preferably, the two connected blade arms are "opposite" one another to facilitate proper blade assembly balance. Here too, the third blade members 27 and the leading edges of blade arms 23a/23b, 24a/24b, 25a/25b and 26a/26b are sharpened.

The blade assembly of the present invention is used on a lawn edger machine as shown in FIG. 7. Lawn edger machine 40 includes a motor 41, wheels 42, a handle 43 to guide the machine, and blade assembly 44. Blade guard 45 is also preferably included.

It is to be appreciated that the blade assembly may be provided in a variety of widths so that a desired cut path width may be selected and obtained. To facilitate this process the hub of the blade assembly is preferably threaded to match threading on the rotating shaft of the lawn edger machine so that the blade assembly may be easily changed. (See, e.g., threads 19 in FIG. 1, and threads 29 in FIG. 4.) Accordingly, the blade assembly is easily changed by unscrewing the undesired blade assembly and screwing on the desired assembly. Alternatively, the lawn edger blade assembly hub may be unthreaded and the blade assembly may be merely pushed onto the blade shaft and secured with a retaining nut or the like.

Most preferably the blade assemblies are provided in a variety of widths ranging from about one inch to about four inches. For example, in one preferred embodiment the invention is provided as a kit comprising a plurality of blade assemblies in various widths so that a desired width of cut may be selected and obtained. Most preferably the kit comprises blade assemblies having 1", 2" and 3" blade assemblies.

One embodiment of an "extra wide" blade assembly is shown in FIG. 8. That Figure shows blade assembly 80 including hub 81, blade members 82a and 82b, blade arms 83a and 84a, and third blade member 87 connecting two adjacent blade arms at their radially extended ends.

By selecting the appropriate blade assembly width, the user can cut a swath appropriate to install landscape items such as landscape timbers with the same machine as he uses to edge around driveways or sidewalks. Also, as with conventional lawn edgers the blade can be adjusted to a variety of cut depths, generally from level with the ground surface to several inches deep.

It will be found that use of the present invention removes substantial amounts of earth the first time the blade assembly is used in a particular location. In fact, some jobs will require that the area be edged twice the first time to provide a nice, clean edging job. Thereafter however, the ease of operation is vastly improved because the previously removed earth is not removed again during second and subsequent edgings.

It is to be appreciated that the blade assembly of the present invention may be provided with two pairs of blade arms (as shown in FIGS. 1–3), with four pairs of blade arms (as shown in FIGS. 4–6) or with three pairs of blade arms (not shown). The "three blade arm" embodiment preferably has its blade arms spaced approximately 120° apart (at their centers) so that proper blade balance is maintained.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

I claim:

1. A blade assembly for a lawn edging machine, said blade assembly comprising:
    (a) hub member;
    (b) a first radial blade member comprising at least two blade arms extending radially from said hub member; and
    (c) a second radial blade member comprising at least two blade arms extending radially from said hub member; wherein said first and second blade members are positioned in a spaced apart relation so that a space is defined between said first and second blade members when said blade members rotate around said hub; and
    (d) a lateral blade member that bridges said first and second blade members without eliminating the space that is defined between said first and second blade members when said first and second blade members rotate around said hub.

2. The blade assembly of claim 1 wherein said hub member is threaded.

3. The blade assembly of claim 1 wherein said at least two blade arms of said first blade member are substantially coplanar.

4. The blade assembly of claim 3 wherein said at least two blade arms of said second blade member are substantially coplanar.

5. The blade assembly of claim 4 wherein said first and second blade members are positioned in a substantially parallel spaced apart relation.

6. The blade assembly of claim 5 wherein said first and second blade members are spaced apart by a distance of between one and four inches.

7. The blade assembly of claim 3 wherein said at least two blade arms of said second blade member comprises at least four substantially coplanar blade arms.

8. The blade assembly of claim 1 wherein said at least two blade arms of said first blade member comprises at least four substantially coplanar blade arms.

9. The blade assembly of claim 8 and further comprising a fourth blade member bridging at least one of said first blade member blade arms to at least one of said second blade member blade arms near their radially extended ends.

10. A lawn edger, comprising:
    (a) a motor for turning a shaft;
    (b) at least two wheels for moving the edger along the ground;
    (c) a handle for guiding the lawn edger as it moves along the ground;
    (d) a shaft operably coupled to said motor; and
    (e) a blade assembly coupled to said shaft; wherein said blade assembly comprises:
        (i) a hub member;
        (ii) a first radial blade member comprising at least two blade arms extending radially from said hub member; and (iii) a second radial blade member comprising at least two blade arms extending radially from said hub member;

wherein said first and second blade members are positioned in a spaced apart relation so that a disc-shaped space is defined between said first and second blade members when said blade members rotate around said hub; and (d) a lateral blade member that bridges said first and second blade members without eliminating the space that is defined between said first and second blade members when said first and second blade members rotate around said hub.

* * * * *

UNITED STATES PATENT AND TRADEMARK OFFICE
CERTIFICATE OF CORRECTION

PATENT NO. : 5,592,992                    Page 1 of 3

DATED     : January 14, 1997

INVENTOR(S) : Timothy J. Thompson

It is certified that error appears in the above-identified patent and that said Letters Patent is hereby corrected as shown below:

The title page showing the illustrative figure should be deleted and be replaced with the attached title page, Figs 1 and 4 should be deleted and substitute therefor the attached Figs.

Signed and Sealed this

Seventeenth Day of June, 1997

*Attest:*

BRUCE LEHMAN

*Attesting Officer*    *Commissioner of Patents and Trademarks*

United States Patent [19]

Thompson

[11] Patent Number: 5,592,992
[45] Date of Patent: Jan. 14, 1997

[54] LAWN EDGER BLADE ASSEMBLY

[76] Inventor: Timothy J. Thompson, 9921 Ridge Dr., Indianapolis, Ind. 46256

[21] Appl. No.: 482,863

[22] Filed: Jun. 7, 1995

[51] Int. Cl.$^6$ .................................................. A01B 45/04
[52] U.S. Cl. .............................. 172/15; 172/17; 172/42; 172/123; 172/548; 172/766; 30/347; 30/DIG. 5
[58] Field of Search ................................ 172/15, 13, 17, 172/766, 772, 772.5, 42, 118, 119, 120, 122, 123, 121, 548; 37/364, 365, 352, 94; 56/256, 255, 295; 30/347, 500, DIG. 5, 508, 265

[56] References Cited

U.S. PATENT DOCUMENTS

| | | | |
|---|---|---|---|
| 2,515,732 | 7/1950 | Parry | 172/15 |
| 2,555,441 | 6/1951 | Hackney . | |
| 2,630,747 | 3/1953 | Mintz | 56/256 X |
| 2,634,667 | 4/1953 | Woolwine | 172/15 |
| 2,723,614 | 11/1955 | Engwall | 172/15 |
| 2,746,229 | 5/1956 | Orr | 56/256 |
| 2,826,889 | 3/1958 | Menge | 172/15 X |
| 2,882,977 | 4/1959 | Smith et al. | 172/15 |
| 2,913,058 | 11/1959 | Smith et al. | 172/15 |
| 3,102,376 | 9/1963 | Henderson | 172/15 |
| 3,141,507 | 7/1964 | Henry et al. | 172/15 |
| 3,690,384 | 9/1972 | Patterson | 172/15 X |
| 3,739,856 | 6/1973 | Ray | 56/256 X |
| 3,907,040 | 9/1975 | Trusty | 172/15 |
| 4,002,205 | 1/1977 | Falk | 172/15 |
| 4,072,195 | 2/1978 | Carlson | 172/15 |
| 4,653,590 | 3/1987 | Shank | 172/15 |
| 4,678,042 | 7/1987 | Barton et al. | 172/15 |
| 4,706,446 | 11/1987 | Doi et al. | 30/347 X |
| 4,979,573 | 12/1990 | Williamson | 172/15 |

FOREIGN PATENT DOCUMENTS

| | | | |
|---|---|---|---|
| 0109571 | 5/1984 | European Pat. Off. | 172/15 |
| 602692 | 3/1960 | Italy | 37/365 |

Primary Examiner—Terry Lee Melius
Assistant Examiner—Christopher J. Novosad
Attorney, Agent, or Firm—Woodard, Emhardt, Naughton, Moriarty & McNett

[57] ABSTRACT

A blade assembly for a lawn edging machine. The blade assembly includes a hub, at least two spaced-apart blade members having two or more blade arms extending radially therefrom, and a horizontal blade member connecting the two blade members at their radially extended arm ends.

10 Claims, 3 Drawing Sheets

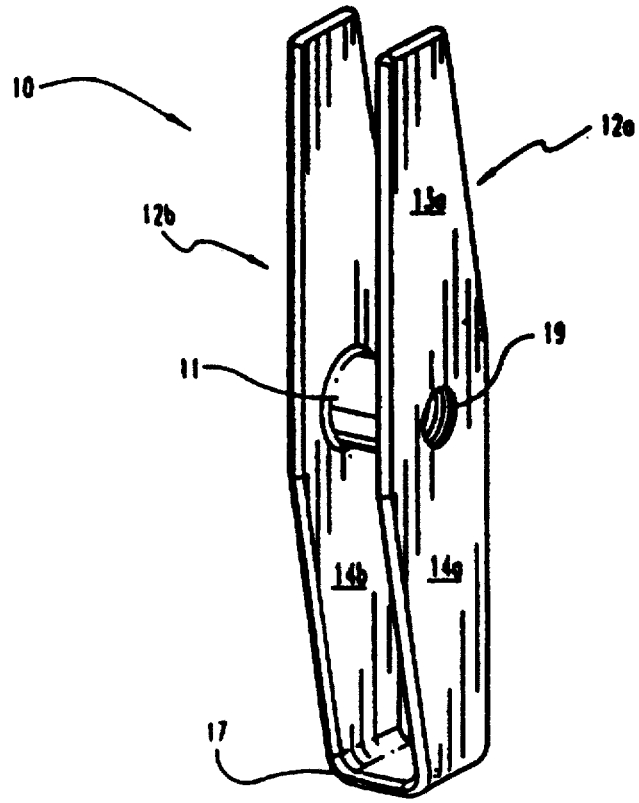

UNITED STATES PATENT AND TRADEMARK OFFICE
CERTIFICATE OF CORRECTION

PATENT NO. : 5,592,992

DATED : January 14, 1997

INVENTOR(S) : Timothy J. Thompson

It is certified that error appears in the above-identified patent and that said Letters Patent is hereby corrected as shown below:

ADD REFERENCE NUMBERS 19 AND 29 TO FIGS. 1 AND 4, RESPECTIVELY.

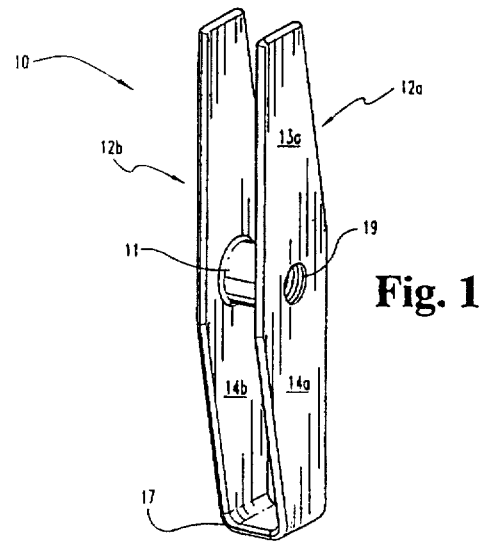

Fig. 1

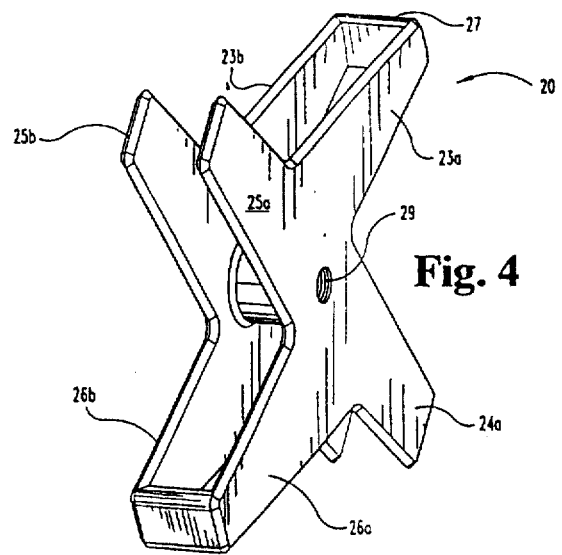

Fig. 4